US012288162B2

(12) United States Patent
Versace et al.

(10) Patent No.: US 12,288,162 B2
(45) Date of Patent: Apr. 29, 2025

(54) SYSTEMS AND METHODS FOR DEEP NEURAL NETWORKS ON DEVICE LEARNING (ONLINE AND OFFLINE) WITH AND WITHOUT SUPERVISION

(71) Applicant: Neurala, Inc., Boston, MA (US)

(72) Inventors: Massimiliano Versace, Milton, MA (US); Daniel Glasser, Boston, MA (US); Vesa Tormanen, Boston, MA (US); Anatoli Gorchet, Newton, MA (US); Heather Ames Versace, Milton, MA (US); Jeremy Wurbs, Worcester, MA (US)

(73) Assignee: Neurala, Inc., Boston, MA (US)

( * ) Notice: Subject to any disclaimer, the term of this patent is extended or adjusted under 35 U.S.C. 154(b) by 959 days.

(21) Appl. No.: 16/952,250

(22) Filed: Nov. 19, 2020

(65) Prior Publication Data

US 2021/0216865 A1    Jul. 15, 2021

Related U.S. Application Data

(63) Continuation of application No. PCT/US2019/033345, filed on May 21, 2019.
(Continued)

(51) Int. Cl.
*G06N 3/08* (2023.01)
*G06F 18/214* (2023.01)
(Continued)

(52) U.S. Cl.
CPC .......... *G06N 3/084* (2013.01); *G06F 18/214* (2023.01); *G06F 18/22* (2023.01);
(Continued)

(58) Field of Classification Search
CPC .......... G06N 3/084; G06N 3/08; G06V 10/96; G06V 10/82; G06V 10/764; G06F 18/22;
(Continued)

(56) References Cited

U.S. PATENT DOCUMENTS 7,587,101 B1    9/2009 Bourdev
7,900,225 B2    3/2011 Lyon et al.
(Continued)

FOREIGN PATENT DOCUMENTS

CN    106250931 A    12/2016
CN    106250812 A    8/2019
(Continued)

OTHER PUBLICATIONS

Huynh ("DeepMon: Mobile GPU-based Deep Learning Framework for Continuous Vision Applications") MobiSys '17, Jun. 19-23, 2017, Niagara Falls, NY, USA. (Year: 2017).*
(Continued)

*Primary Examiner* — Michael W Ayers
*Assistant Examiner* — Su-Ting Chuang
(74) *Attorney, Agent, or Firm* — Smith Baluch LLP

(57) ABSTRACT

An artificial neural network (ANN) that learns at the Edge (e.g., on a smart phone) can be faster and use less network bandwidth than an ANN trained on a server and distributed to the Edge. Learning at the compute edge can be accomplished by executing Lifelong Deep Neural Network (L-DNN) technology at the compute edge. L-DNN technology uses a representation-rich, DNN-based subsystem with a fast-learning subsystem to learn new features quickly without forgetting previously learned features. Compared to a conventional DNN, L-DNN uses much less data to build robust networks, has dramatically shorter training time, and learns on-device instead of on servers without re-training or storing data. An edge device with L-DNN can learn con-
(Continued)

tinuously after deployment, eliminating costs in data collection and annotation, memory, and compute power. This fast, local, on-device learning can be used in unsupervised mode to make personal assistants more intelligent and enhance frequently used apps.

23 Claims, 4 Drawing Sheets

Related U.S. Application Data

(60) Provisional application No. 62/680,937, filed on Jun. 5, 2018, provisional application No. 62/674,346, filed on May 21, 2018.

(51) Int. Cl.
| | |
|---|---|
| *G06F 18/22* | (2023.01) |
| *G06F 18/2411* | (2023.01) |
| *G06N 3/084* | (2023.01) |
| *G06V 10/764* | (2022.01) |
| *G06V 10/82* | (2022.01) |
| *G06V 10/96* | (2022.01) |

(52) U.S. Cl.
CPC ......... *G06F 18/2411* (2023.01); *G06N 3/08* (2013.01); *G06V 10/764* (2022.01); *G06V 10/82* (2022.01); *G06V 10/96* (2022.01)

(58) Field of Classification Search
CPC ... G06F 18/2411; G06F 18/214; G06F 18/213
See application file for complete search history.

(56) References Cited

U.S. PATENT DOCUMENTS

| | | | |
|---|---|---|---|
| 8,165,407 | B1 | 4/2012 | Khosla et al. |
| 8,259,995 | B1 | 9/2012 | Schendel et al. |
| 9,361,943 | B2 | 6/2016 | Thrun |
| 9,589,595 | B2 | 3/2017 | Gao et al. |
| 9,626,566 | B2 | 4/2017 | Versace et al. |
| 9,754,190 | B1 | 9/2017 | Guttmann |
| 10,037,471 | B2 | 7/2018 | Satzoda et al. |
| 10,503,976 | B2 | 12/2019 | Versace et al. |
| 10,789,291 | B1 | 9/2020 | Zadeh et al. |
| 2008/0201734 | A1 | 8/2008 | Lyon et al. |
| 2009/0144772 | A1 | 6/2009 | Fink et al. |
| 2009/0196493 | A1* | 8/2009 | Widrow ............. G06V 10/7715 707/999.005 |
| 2011/0010388 | A1 | 1/2011 | MacLaurin |
| 2011/0029533 | A1 | 2/2011 | Jayakody et al. |
| 2011/0052068 | A1 | 3/2011 | Cobb et al. |
| 2012/0072215 | A1 | 3/2012 | Yu et al. |
| 2012/0194649 | A1 | 8/2012 | Javidi et al. |
| 2012/0269436 | A1 | 10/2012 | Mensink et al. |
| 2013/0022242 | A1 | 1/2013 | Cobb et al. |
| 2013/0216094 | A1 | 8/2013 | Delean |
| 2013/0242093 | A1 | 9/2013 | Cobb et al. |
| 2014/0050391 | A1 | 2/2014 | Angelova et al. |
| 2015/0016712 | A1* | 1/2015 | Rhoads ................. G06F 16/587 707/769 |
| 2015/0070526 | A1 | 3/2015 | Kinoshita |
| 2015/0146991 | A1 | 5/2015 | Nakano et al. |
| 2015/0248586 | A1 | 9/2015 | Gaidon et al. |
| 2015/0254555 | A1 | 9/2015 | Williams et al. |
| 2015/0269439 | A1 | 9/2015 | Versace et al. |
| 2015/0324686 | A1 | 11/2015 | Julian et al. |
| 2016/0005175 | A1 | 1/2016 | Fujita |
| 2016/0092751 | A1 | 3/2016 | Zavesky et al. |
| 2016/0140424 | A1 | 5/2016 | Wang et al. |
| 2016/0148079 | A1 | 5/2016 | Shen et al. |
| 2017/0032222 | A1 | 2/2017 | Sharma et al. |
| 2017/0039468 | A1 | 2/2017 | Zeiler |
| 2017/0039469 | A1 | 2/2017 | Majumdar et al. |
| 2017/0061249 | A1 | 3/2017 | Estrada et al. |
| 2017/0140236 | A1* | 5/2017 | Price ....................... G06N 3/045 |
| 2017/0154246 | A1 | 6/2017 | Guttmann |
| 2017/0154269 | A1 | 6/2017 | Guttmann |
| 2017/0154273 | A1 | 6/2017 | Guttmann |
| 2017/0169567 | A1 | 6/2017 | Chefd'hotel et al. |
| 2017/0193298 | A1 | 7/2017 | Versace et al. |
| 2017/0262736 | A1* | 9/2017 | Yu ......................... G06V 10/764 |
| 2018/0012082 | A1* | 1/2018 | Satazoda .............. G06V 10/763 |
| 2018/0024547 | A1 | 1/2018 | Balachandran et al. |
| 2018/0053530 | A1 | 2/2018 | Moore et al. |
| 2018/0067631 | A1 | 3/2018 | Thiercelin et al. |
| 2018/0074519 | A1 | 3/2018 | Qin et al. |
| 2018/0091832 | A1 | 3/2018 | Zeiler et al. |
| 2018/0136332 | A1 | 5/2018 | Barfield, Jr. et al. |
| 2018/0149138 | A1 | 5/2018 | Thiercelin et al. |
| 2018/0150694 | A1 | 5/2018 | Guttmann |
| 2018/0150695 | A1 | 5/2018 | Guttmann |
| 2018/0150697 | A1 | 5/2018 | Guttmann et al. |
| 2018/0150698 | A1 | 5/2018 | Guttmann et al. |
| 2018/0336479 | A1 | 11/2018 | Guttmann |
| 2018/0373980 | A1 | 12/2018 | Huval |
| 2019/0095464 | A1* | 3/2019 | Xie ....................... G06V 10/764 |
| 2019/0130231 | A1* | 5/2019 | Liu ........................ G06N 3/045 |
| 2019/0279046 | A1 | 9/2019 | Han et al. |
| 2020/0151446 | A1 | 5/2020 | Versace et al. |

FOREIGN PATENT DOCUMENTS

| | | |
|---|---|---|
| GB | 2491987 B | 3/2013 |
| JP | 2015106197 A | 6/2015 |
| WO | 2019050515 A1 | 3/2019 |

OTHER PUBLICATIONS

Wang ("Aesthetic Quality Assessment of Photos with Faces") Y. Zhao et al. (Eds.): ICIG 2017, Part III, LNCS 10668, pp. 483-495, 2017. (Year: 2017).*
Sun ("Photo Filter Recommendation by Category-Aware Aesthetic Learning") arXiv:1608.05339v2 [cs.CV] Mar. 27, 2017 (Year: 2017).*
Sarwar ("Gabor filter assisted energy efficient fast learning Convolutional Neural Networks") 2017 IEEE/ACM International Symposium on Low Power Electronics (Year: 2017).*
Wang2 ("Cost-Effective Active Learning for Deep Image Classification") IEEE Transactions on Circuits and Systems for Video Technology, vol. 27, No. 12, Dec. 2017 (Year: 2017).*
Schwarz ("Will People Like Your Image? Learning the Aesthetic Space") arXiv:1611.05203v2 [cs.CV] Dec. 4, 2017 (Year: 2017).*
Chaib ("Deep feature extraction and combination for remote sensing image classification based on pre-trained CNN models") Ninth International Conference on Digital Image Processing (ICDIP 2017), (Year: 2017).*
Chavan ("A Hybrid Deep Neural Network for Online Learning") 2017 Ninth International Conference on Advances in Pattern Recognition (ICAPR) (Year: 2017).*
Hsu ("CNN-Based Joint Clustering and Representation Learning with Feature Drift Compensation for Large-Scale Image Data") Digital Object Identifier 10.1109/TMM.2017.2745702 Date of publication Aug. 29, 2017 (Year: 2017).*
Xu ("Accelerating Convolutional Neural Networks for Continuous Mobile Vision via Cache Reuse") arXiv:1712.01670v1 [cs.CV] Dec. 1, 2017 (Year: 2017).*
Park ("Accelerating Image Classification using Feature Map Similarity in Convolutional Neural Networks") Appl. Sci. 2019, 9(1), 108; https://doi.org/10.3390/app9010108 (Year: 2018).*
Guerin ("Improving Image Clustering With Multiple Pretrained CNN Feature Extractors") arXiv:1807.07760v1 [cs.CV] Jul. 20, 2018 (Year: 2018).*
Grossberg, S., and Versace, M. (2008) Spikes, synchrony, and attentive learning by laminar thalamocortical circuits. Brain Research, 1218C, 278-312.
Hagen, T. R., Hjelmervik, J., Lie, K.-A., Natvig, J., and Ofstad Henriksen, M. 2005. Visual simulation of shallow-water waves. Simulation Modelling Practice and Theory 13, pp. 716-726.

(56) References Cited

OTHER PUBLICATIONS

Hasselt, Hado Van. Double q-learning. In Advances in Neural Information Processing Systems, pp. 2613-2621, 2010.
Hinton, G. E., Osindero, S., and Teh, Y. (2006). A fast learning algorithm for deep belief nets. Neural Computation, 18, 1527-1554.
Hodgkin, A. L., and Huxley, A. F. 1952. Quantitative description of membrane current and its application to conduction and excitation in nerve. J Physiol 117, pp. 500-544.
Hopfield, J. 1982. Neural networks and physical systems with emergent collective computational abilities. In Proc Natl Acad Sci USA, vol. 79, pp. 2554-2558.
Ilie, A. 2002. Optical character recognition on graphics hardware. Tech. Rep. integrative paper, UNCCH, Department of Computer Science, 9 pages.
International Search Report and Written Opinion in International Patent Application No. PCT/US19/26783 mailed Aug. 6, 2019, 13 pages.
International Search Report and Written Opinion in International Patent Application No. PCT/US19/33345 mailed Aug. 9, 2019, 13 pages.
International Search Report and Written Opinion in International Patent Application No. PCT/US2018/023155 mailed Jul. 30, 2018, 19 pages.
International Search Report and Written Opinion in International Patent Application No. PCT/US2018/031833 mailed Aug. 31, 2018, 16 pages.
International Search Report and Written Opinion mailed Aug. 31, 2018 from International Application No. PCT/US2018/031833, 12 pages.
Itti, L., and Koch, C. (2001). Computational modelling of visual attention. Nature Reviews Neuroscience, 2 (3), 194-203.
Itti, L., Koch, C., and Niebur, E. (1998). A Model of Saliency-Based Visual Attention for Rapid Scene Analysis, 1-6.
Jarrett, K., Kavukcuoglu, K., Ranzato, M. A., & LeCun, Y. (Sep. 2009). What is the best multi-stage architecture for object recognition?. In Computer Vision, 2009 IEEE 12th International Conference on (pp. 2146-2153). IEEE.
John C. Platt, Probabilistic output for support vector machines and comparisons to regularized likelihood methods, Mar. 26, 1999, Advances in Large Margin Classifiers. 11 pages.
Kasaei et al., "An interactive open-ended learning approach for 3d object recognition." 2014 IEEE international conference on autonomous robot systems and competitions (ICARSC). IEEE, 2014. 6 pages.
Kestello, How ActiveTrack works on the DJI Mavic Air. DroneDJ Jan. 31, 2018. Accessed at https://dronedj.com/2018/01/31/how-activetrack-works-on-the-dji-mavic-air/ on Apr. 8, 2019. 7 pages.
Khaligh-Razavi, S.-M. et al., Deep Supervised, but Not Unsupervised, Models May Explain IT Cortical Representation, PLoS Computational Biology, vol. 10, Issue 11, 29 pages (Nov. 2014).
Kim, S., Novel approaches to clustering, biclustering and algorithms based on adaptive resonance theory and intelligent control, Doctoral Dissertations, Missouri University of Science and Technology, 125 pages (2016).
Kipfer, P., Segal, M., and Westermann, R. 2004. UberFlow: A GPU-Based Particle Engine. In Proceedings of the SIGGRAPH/Eurographics Workshop on Graphics Hardware 2004, pp. 115-122.
Kolb, A., L. Latta, and C. Rezk-Salama. 2004. "Hardware-Based Simulation and Collision Detection for Large Particle Systems." In Proceedings of the SIGGRAPH/Eurographics Workshop on Graphics Hardware 2004, pp. 123-131.
Kompella, Varun Raj, Luciw, Matthew, and Schmidhuber, Jurgen. Incremental slow feature analysis: Adaptive low-complexity slow feature updating from high-dimensional input streams. Neural Computation, 24(11):2994-3024, 2012.
Kowler, E. (2011). Eye movements: The past 25 years. Vision Research, 51(13), 1457-1483. doi:10.1016/j.visres.2010.12.014.
Larochelle H., & Hinton G. (2012). Learning to combine foveal glimpses with a third-order Boltzmann machine. NIPS 2010, 1243-1251.

LeCun, Y., Kavukcuoglu, K., & Farabet, C. (May 2010). Convolutional networks and applications in vision. In Circuits and Systems (ISCAS), Proceedings of 2010 IEEE International Symposium on (pp. 253-256).
Lee, D. D. and Seung, H. S. (1999). Learning the parts of objects by non-negative matrix factorization. Nature, 401 (6755):788-791.
Lee, D. D., and Seung, H. S. (1997). "Unsupervised learning by convex and conic coding." Advances in Neural Information Processing Systems, 9.
Legenstein, R., Wilbert, N., and Wiskott, L. Reinforcement learning on slow features of high-dimensional input streams. PLoS Computational Biology, 6(8), 2010. ISSN 1553-734X. 13 pages.
Leveille, J., Ames, H., Chandler, B., Gorchetchnikov, A., Mingolla, E., Patrick, S., and Versace, M. (2010) Learning in a distributed software architecture for large-scale neural modeling. BIONETICS10, Boston, MA, USA. 8 pages.
Livitz G., Versace M., Gorchetchnikov A., Vasilkoski Z., Ames H., Chandler B., Leveille J. and Mingolla E. (2011) Adaptive, brain-like systems give robots complex behaviors, The Neuromorphic Engineer, : 10.2417/1201101.003500 Feb. 2011. 3 pages.
Livitz, G., Versace, M., Gorchetchnikov, A., Vasilkoski, Z., Ames, H., Chandler, B., Léveillé, J., Mingolla, E., Snider, G., Amerson, R., Carter, D., Abdalla, H., and Qureshi, S. (2011) Visually-Guided Adaptive Robot (ViGuAR). Proceedings of the International Joint Conference on Neural Networks (IJCNN) 2011, San Jose, CA, USA. 9 pages.
Lowe, D.G.(2004). Distinctive Image Features from Scale-Invariant Keypoints. Journal International Journal of Computer Vision Archive vol. 60, 2, 91-110.
Lu, Z.L., Liu, J., and Dosher, B.A. (2010) Modeling mechanisms of perceptual learning with augmented Hebbian re-weighting. Vision Research, 50(4). 375-390.
Mahadevan, S. Proto-value functions: Developmental reinforcement learning. In Proceedings of the 22nd International Conference on Machine learning, pp. 553-560. ACM, 2005.
Meuth, J.R. and Wunsch, D.C. (2007) A Survey of Neural Computation on Graphics Processing Hardware. 22nd IEEE International Symposium on Intelligent Control, Part of IEEE Multi-Conference on Systems and Control, Singapore, Oct. 1-3, 2007, 5 pages.
Mishkin M, Ungerleider LG. (1982). "Contribution of striate inputs to the visuospatial functions of parieto-preoccipital cortex in monkeys," Behav Brain Res, 6 (1): 57-77.
Mnih, Volodymyr, Kavukcuoglu, Koray, Silver, David, Rusu, Andrei A, Veness, Joel, Bellemare, Marc G, Graves, Alex, Riedmiller, Martin, Fidjeland, Andreas K, Ostrovski, Georg, et al. Human-level control through deep reinforcement learning. Nature, 518(7540):529-533, Feb. 25, 2015.
Moore, Andrew W and Atkeson, Christopher G. Prioritized sweeping: Reinforcement learning with less data and less time. Machine Learning, 13(1):103-130, 1993.
Najemnik, J., and Geisler, W. (2009). Simple summation rule for optimal fixation selection in visual search. Vision Research. 49, 1286-1294.
Oh, K.-S., and Jung, K. 2004. GPU implementation of neural networks. Pattern Recognition 37, pp. 1311-1314.
Oja, E. (1982). Simplified neuron model as a principal component analyzer. Journal of Mathematical Biology 15(3), 267-273.
Raijmakers, M.E.J., and Molenaar, P. (1997). Exact ART: A complete implementation of an ART network. Neural Networks 10 (4), 649-669.
Rainmaker, Dji Mavic Air: How Active Track Really Works!. YouTube Jan. 31, 2018. Accessed at https://www.youtube.com/watch?v=QQa7BvkXfgk&feature=youtu.be on Apr. 8, 2019.
Ranzato, M. A., Huang, F. J., Boureau, Y. L., & Lecun, Y. (Jun. 2007). Unsupervised learning of invariant feature hierarchies with applications to object recognition. In Computer Vision and Pattern Recognition, 2007. CVPR'07. IEEE Conference on (pp. 1-8). IEEE.
Raudies, F., Eldridge, S., Joshi, A., and Versace, M. (Aug. 20, 2014). Learning to navigate in a virtual world using optic flow and stereo disparity signals. Artificial Life and Robotics, DOI 10.1007/s10015-014-0153-1. 15 pages.

(56) References Cited

OTHER PUBLICATIONS

Ren, Y. et al., Ensemble Classification and Regression—Recent Developments, Applications and Future Directions, in IEEE Computational Intelligence Magazine, 10.1109/MCI.2015.2471235, 14 pages (2016).
Riesenhuber, M., & Poggio, T. (1999). Hierarchical models of object recognition in cortex. Nature Neuroscience, 2 (11), 1019-1025.
Riesenhuber, M., & Poggio, T. (2000). Models of object recognition. Nature Neuroscience, 3, 1199-1204.
Rolfes, T. 2004. Artificial Neural Networks on Programmable Graphics Hardware. In Game Programming Gems 4, A. Kirmse, Ed. Charles River Media, Hingham, MA, pp. 373-378.
Attari et al. "Nazr-CNN: object detection and fine-grained classification in crowdsourced UAV images." IEEE International Conference on Data Science and Advanced Analytics (DSAA). 2016. 9 pages.
Bendale et al. "Towards open set deep networks." Proceedings of the IEEE conference on computer vision and pattern recognition. 2016 (10 pages).
Grabner et al., "Real-time tracking via on-line boosting." Bmvc. vol. 1. No. 5. 2006 (10 pages).
Kalal et al. "Forward-backward error: Automatic detection of tracking failures." 2010 20th international conference on pattern recognition. IEEE, 2010 4 pages.
Lee, et al. "Dual-Memory Deep Learning Architectures for Lifelong Learning of Everyday Human Behaviors." IJCAI. 2016 (7 pages).
Nebehay et al. "Consensus-based matching and tracking of keypoints for object tracking." IEEE Winter Conference on Applications of Computer Vision. IEEE, 2014. 8 pages.
Nebehay, Robust object tracking based on tracking-learning-detection. Masters Thesis, Faculty of Informatics, TU Vienna 2012. (60 pages).
Papadopoulos et al. "We don't need No. bounding-boxes: Training object class detectors using only human verification." Apr. 2017 (Year: 2017) arXiv 10 pages.
Scherreik et al. "Automatic threshold selection for multi-class open set recognition." Automatic Target Recognition XXVII. vol. 10202. International Society for Optics and Photonics, 2017 9 pages.
Schmidhuber "Formal theory of creativity, fun, and intrinsic motivation (1990-2010)." IEEE Transactions on Autonomous Mental Development 2.3 (2010): 230-247.
Rublee, E., Rabaud, V., Konolige, K., & Bradski, G. (2011). ORB: An efficient alternative to SIFT or SURF. In IEEE International Conference on Computer Vision (ICCV) 2011, 2564-2571.
Ruesch, J. et al. 2008. Multimodal Saliency-Based Bottom-Up Attention a Framework for the Humanoid Robot iCub. 2008 IEEE International Conference on Robotics and Automation, pp. 962-965.
Rumelhart D., Hinton G., and Williams, R. (1986). Learning internal representations by error propagation. In Parallel distributed processing: explorations in the microstructure of cognition, vol. 1, MIT Press. 45 pages.
Rumpf, M. and Strzodka, R. Graphics processor units: New prospects for parallel computing. In Are Magnus Bruaset and Aslak Tveito, editors, Numerical Solution of Partial Differential Equations on Parallel Computers, vol. 51 of Lecture Notes in Computational Science and Engineering, pp. 89-134. Springer, 2005.
Salakhutdinov, R., & Hinton, G. E. (2009). Deep boltzmann machines. In International Conference on Artificial Intelligence and Statistics (pp. 448-455).
Schaul, Tom, Quan, John, Antonoglou, Ioannis, and Silver, David. Prioritized experience replay. arXiv preprint, arXiv: 1511.05952, Nov. 18, 2015. 21 pages.
Schmidhuber, J. (2010). Formal theory of creativity, fun, and intrinsic motivation (1990-2010). Autonomous Mental Development, IEEE Transactions on, 2(3), 230-247.
Schmidhuber, Jürgen. Curious model-building control systems. In Neural Networks, 1991 IEEE International Joint Conference on, pp. 1458-1463. IEEE, 1991.
Seibert, M., & Waxman, A.M. (1992). Adaptive 3-D Object Recognition from Multiple Views. IEEE Transactions on Pattern Analysis and Machine Intelligence, 14 (2), 107-124.
Sherbakov, L. and Versace, M. (2014) Computational principles for an autonomous active vision system. Ph.D., Boston University, http://search.proquest.com/docview/1558856407. 194 pages.
Sherbakov, L., Livitz, G., Sohail, A., Gorchetchnikov, A., Mingolla, E., Ames, H., and Versace, M (2013b) A computational model of the role of eye-movements in object disambiguation. Cosyne, Feb. 28-Mar. 3, 2013. Salt Lake City, UT, USA. 2 pages.
Sherbakov, L., Livitz, G., Sohail, A., Gorchetchnikov, A., Mingolla, E., Ames, H., and Versace, M. (2013a) CogEye: An online active vision system that disambiguates and recognizes objects. NeuComp 2013. 2 pages.
Smolensky, Paul. Information processing in dynamical systems: Foundations of harmony theory. No. CU-CS-321-86. Colorado Univ at Boulder Dept of Computer Science, 1986. 88 pages.
Snider, Greg, et al. "From synapses to circuitry: Using memristive memory to explore the electronic brain." IEEE Computer, vol. 44(2). (2011): 21-28.
Spratling, M. W. (2008). Predictive coding as a model of biased competition in visual attention. Vision Research, 48 (12):1391-1408.
Spratling, M. W. (2012). Unsupervised learning of generative and discriminative weights encoding elementary image components in a predictive coding model of cortical function. Neural Computation, 24(1):60-103.
Spratling, M. W., De Meyer, K., and Kompass, R. (2009). Unsupervised learning of overlapping image components using divisive input modulation. Computational Intelligence and Neuroscience. 20 pages.
Sprekeler, H. On the relation of slow feature analysis and laplacian eigenmaps. Neural Computation, pp. 1-16, 2011.
Sun, Z. et al., Recognition of SAR target based on multilayer auto-encoder and SNN, International Journal of Innovative Computing, Information and Control, vol. 9, No. 11, pp. 4331-4341, Nov. 2013.
Sutton, R. S., and Barto, A. G. (1998). Reinforcement learning: An introduction(vol. 1, No. 1). Cambridge MA: MIT press. 10 pages.
Tong, F., Ze-Nian Li, (1995). Reciprocal-wedge transform for space-variant sensing, Pattern Analysis and Machine Intelligence, IEEE Transactions on, vol. 17, No. 5, pp. 500-551. doi: 10.1109/34.391393.
Torralba, A., Oliva, A., Castelhano, M.S., Henderson, J.M. (2006). Contextual guidance of eye movements and attention in real-world scenes: the role of global features in object search. Psychological Review, 113(4).766-786.
Van Hasselt, Hado, Guez, Arthur, and Silver, David. Deep reinforcement learning with double q-learning. arXiv preprint arXiv: 1509.06461, Sep. 22, 2015. 7 pages.
Versace, Brain-inspired computing. Invited keynote address, Bionetics 2010, Boston, MA, USA. 1 page.
Versace, M. (2006) From spikes to interareal synchrony: how attentive matching and resonance control learning and information processing by laminar thalamocortical circuits. NSF Science of Learning Centers PI Meeting, Washington, DC, USA. 1 page.
Versace, M., (2010) Open-source software for computational neuroscience: Bridging the gap between models and behavior. In Horizons in Computer Science Research, vol. 3. 43 pages.
Versace, M., Ames, H., Léveillé, J., Fortenberry, B., and Gorchetchnikov, A. (2008) KInNeSS: A modular framework for computational neuroscience. Neuroinformatics, 2008 Winter; 6(4):291-309. Epub Aug. 10, 2008.
Versace, M., and Chandler, B. (2010) MoNETA: A Mind Made from Memristors. IEEE Spectrum, Dec. 2010. 8 pages.
Versace, TEDx Fulbright, Invited talk, Washington DC, Apr. 5, 2014. 30 pages.
Webster, Bachevalier, Ungerleider (1994). Connections of IT areas TEO and TE with parietal and frontal cortex in macaque monkeys. Cerebal Cortex, 4(5), 470-483.
Wiskott, Laurenz and Sejnowski, Terrence. Slow feature analysis: Unsupervised learning of invariances. Neural Computation, 14(4):715-770, 2002.

(56) References Cited

OTHER PUBLICATIONS

Wu, Yan & J. Cai, H. (2010). A Simulation Study of Deep Belief Network Combined with the Self-Organizing Mechanism of Adaptive Resonance Theory. 10.1109/CISE.2010.5677265, 4 pages.
You Can Film Like a Pro with DJI Drone "ActiveTrack"—With Video Tutorials. DJI Guides Dec. 17, 2017. Accessed at https://store.dji.com/guides/film-like-a-pro-with-activetrack/ on Apr. 8, 2019. 8 pages.
Yu et al., "Leveraging knowledge-based inference for material classification." Proceedings of the 23rd ACM international conference on Multimedia. 2015. 4 pages.
Adaptive resonance theory, Wikipedia Apr. 30, 2017. Accessed at https://en.wikipedia.org/wiki/Adaptive_resonance_theory on Jan. 22, 2021. 4 pages.
Adelson, E. H., Anderson, C. H., Bergen, J. R., Burt, P. J., & Ogden, J. M. (1984). Pyramid methods in image processing. RCA Engineer, 29(6), 33-41.
Aggarwal, Charu C, Hinneburg, Alexander, and Keim, Daniel A. On the surprising behavior of distance metrics in high dimensional space. Springer, 2001. 15 pages.
Alex Krizhevsky, Ilya Sutskever, Geoffrey E. Hinton, ImageNet classification with deep convolutional neural networks, Jun. 2017, Communications of the ACM, vol. 60 Issue 6, pp. 84-90.
Al-Kaysi, A. M. et al., A Multichannel Deep Belief Network for the Classification of EEG Data, from Ontology-based Information Extraction for Residential Land Use Suitability: A Case Study of the City of Regina, Canada, DOI 10.1007/978-3-319-26561-2_5, 8 pages (Nov. 2015).
Ames, H, Versace, M., Gorchetchnikov, A., Chandler, B., Livitz, G., Léveillé, J., Mingolla, E., Carter, D., Abdalla, H., and Snider, G. (2012) Persuading computers to act more like brains. In Advances in Neuromorphic Memristor Science and Applications, Kozma, R.Pino, R., and Pazienza, G. (eds), Springer Verlag. 25 pages.
Ames, H. Mingolla, E., Sohail, A., Chandler, B., Gorchetchnikov, A., Léveillé, J., Livitz, G. and Versace, M. (2012) The Animat. IEEE Pulse, Feb. 2012, 3(1), 47-50.
Apolloni, B. et al., Training a network of mobile neurons, Proceedings of International Joint Conference on Neural Networks, San Jose, CA, doi: 10.1109/IJCNN.2011.6033427, pp. 1683-1691 (Jul. 31-Aug. 5, 2011).
Artificial Intelligence as a Service. Invited talk, Defrag, Broomfield, CO, Nov. 4-6, 2013. 22 pages.
Athiwaratkun et al., "Feature representation in convolutional neural networks." arXiv preprint, arXiv:1507.02313 (2015). 6 pages.
Baraldi, A. and Alpaydin, E. (1998). Simplified ART: A new class of ART algorithms. International Computer Science Institute, Berkeley, CA, TR-98-004, 1998. 42 pages.
Baraldi, A. and Alpaydin, E. (2002). Constructive feedforward ART clustering networks—Part I. IEEE Transactions on Neural Networks 13(3), 645-661.
Baraldi, A. and Parmiggiani, F. (1997). Fuzzy combination of Kohonen's and ART neural network models to detect statistical regularities in a random sequence of multi-valued input patterns. In International Conference on Neural Networks, IEEE. 6 pages.
Baraldi, Andrea and Alpaydin, Ethem. Constructive feedforward ART clustering networks—part II. IEEE Transactions on Neural Networks, 13(3):662-677, May 2002. ISSN 1045-9227. doi: 10.1109/tnn.2002.1000131. URL http://dx.doi.org/10.1109/tnn.2002.1000131.
Bengio, Y., Courville, A., & Vincent, P. Representation learning: A review and new perspectives, IEEE Transactions on Pattern Analysis and Machine Intelligence, vol. 35 Issue 8, Aug. 2013. Pages 1798-1828.
Bernhard, F., and Keriven, R. 2005. Spiking Neurons on GPUs. Tech. Rep. 05-15, Ecole Nationale des Ponts et Chaussees, 8 pages.
Besl, P. J., & Jain, R. C. (1985). Three-dimensional object recognition. ACM Computing Surveys (CSUR), 17(1), 75-145.
Boddapati, V., Classifying Environmental Sounds with Image Networks, Thesis, Faculty of Computing Blekinge Institute of Technology, 37 pages (Feb. 2017).

Bohn, C.-A. Kohonen. 1998. Feature Mapping Through Graphics Hardware. In Proceedings of 3rd Int. Conference on Computational Intelligence and Neurosciences, 4 pages.
Bradski, G., & Grossberg, S. (1995). Fast-learning VIEWNET architectures for recognizing three-dimensional objects from multiple two-dimensional views. Neural Networks, 8 (7-8), 1053-1080.
Canny, J.A. (1986). Computational Approach To Edge Detection, IEEE Trans. Pattern Analysis and Machine Intelligence, 8(6):679-698.
Carpenter, G.A. and Grossberg, S. (1987). A massively parallel architecture for a self-organizing neural pattern recognition machine. Computer Vision, Graphics, and Image Processing 37, 54-115.
Carpenter, G.A., and Grossberg, S. (1995). Adaptive resonance theory (ART). In M. Arbib (Ed.), The Handbook of Brain Theory and Neural Networks. (pp. 79-82). Cambridge, MA: MIT press.
Carpenter, G.A., Grossberg, S. and Rosen, D.B. (1991). Fuzzy ART: Fast stable learning and categorization of analog patterns by an adaptive resonance system. Neural Networks 4, 759-771.
Carpenter, Gail A and Grossberg, Stephen. The art of adaptive pattern recognition by a self-organizing neural network. Computer, 21(3):77-88, 1988.
Chilimbi et al., "Project adam: Building an efficient and scalable deep learning training system." 11th {USENIX} Symposium on Operating Systems Design and Implementation ({OSDI} 14). 2014. 13 pages.
Coifman, R.R. and Maggioni, M. Diffusion wavelets. Applied and Computational Harmonic Analysis, 21(1):53-94, 2006.
Coifman, R.R., Lafon, S., Lee, A.B., Maggioni, M., Nadler, B., Warner, F., and Zucker, S.W. Geometric diffusions as a tool for harmonic analysis and structure definition of data: Diffusion maps. Proceedings of the National Academy of Sciences of the United States of America, 102(21):7426, 2005. 21 pages.
Davis, C. E. 2005. Graphic Processing Unit Computation of Neural Networks. Master's thesis, University of New Mexico, Albuquerque, NM, 121 pages.
DJI Introduces DJI Terra To Capture, Visualize And Analyze Drone Data. Newsroom News Mar. 28, 2019. Accessed at https://www.dji.com/newsroom/news/dji-introduces-dji-terra-to-capture-visualize-and-analyze-drone-data on Apr. 8, 2019. 2 pages.
DJI Launches New Era of Intelligent Flying Cameras. Newsroom News Mar. 2, 2016. Accessed at https://www.dji.com/newsroom/news/dji-launches-new-era-of-intelligent-flying-cameras on Apr. 8, 2019. 4 pages.
DJI Mavic Pro: Active Track Mode. Expert World Travel 2018. Accessed at https://expertworldtravel.com/dji-mavic-pro-active-track-mode/ on Apr. 8, 2019. 6 pages.
Dosher, B.A., and Lu, Z.L. (2010). Mechanisms of perceptual attention in precuing of location. Vision Res., 40(10-12). 1269-1292.
Ellias, S. A., and Grossberg, S. 1975. Pattern formation, contrast control and oscillations in the short term memory of shunting on-center off-surround networks. Biol Cybern 20, pp. 69-98.
Estes, DJI Made a New Sort of Super Drone. Gizmodo Oct. 29, 2018. Accessed at https://gizmodo.com/dji-made-a-new-sort-of-super-drone-1830061489 on Apr. 8, 2019. 6 pages.
Extended European Search Report in European Patent Application No. 18767344.7 dated Dec. 10, 2020, 9 pages.
Extended European Search Report in European Patent Application No. 18799281.3 dated Feb. 4, 2021. 9 pages.
Fazl, A., Grossberg, S., and Mingolla, E. (2009). View-invariant object category learning, recognition, and search: How spatial and object attention are coordinated using surface-based attentional shrouds. Cognitive Psychology 58, 1-48.
Földiák, P. (1990). Forming sparse representations by local anti-Hebbian learning, Biological Cybernetics, vol. 64, pp. 165-170.
Friston K., Adams R., Perrinet L., & Breakspear M. (2012). Perceptions as hypotheses: saccades as experiments. Frontiers in Psychology, 3 (151), 1-20.
Galbraith, B.V, Guenther, F.H., and Versace, M. (2015) A neural network-based exploratory learning and motor planning system for co-robots. Frontiers in Neuroscience, in press. 10 pages.
George, D. and Hawkins, J. (2009). Towards a mathematical theory of cortical micro-circuits. PLoS Computational Biology 5(10), 1-26.

(56) References Cited

OTHER PUBLICATIONS

Georgii, J., and Westermann, R. 2005. Mass-spring systems on the GPU. Simulation Modelling Practice and Theory 13, pp. 693-702.

Gorchetchnikov A., Hasselmo M. E. (2005). A biophysical implementation of a bidirectional graph search algorithm to solve multiple goal navigation tasks. Connection Science, 17(1-2), pp. 145-166.

Gorchetchnikov A., Hasselmo M. E. (2005). A simple rule for spike-timing-dependent plasticity: local influence of AHP current. Neurocomputing, 65-66, pp. 885-890.

Gorchetchnikov A., Versace M., Hasselmo M. E. (2005). A Model of STDP Based on Spatially and Temporally Local Information: Derivation and Combination with Gated Decay. Neural Networks, 18, pp. 458-466.

Gorchetchnikov A., Versace M., Hasselmo M. E. (2005). Spatially and temporally local spike-timing-dependent plasticity rule. In: Proceedings of the International Joint Conference on Neural Networks, No. 1568 in IEEE CD-ROM Catalog No. 05CH37662C, pp. 390-396.

Gorchetchnikov, A. 2017. An Approach to a Biologically Realistic Simulation of Natural Memory. Master's thesis, Middle Tennessee State University, Murfreesboro, TN, 70 pages.

Grossberg, S. (1973). Contour enhancement, short-term memory, and constancies in reverberating neural networks. Studies in Applied Mathematics 52, 213-257.

Grossberg, S., and Huang, T.R. (2009). Artscene: A neural system for natural scene classification. Journal of Vision, 9 (4), 6.1-19. doi:10.1167/9.4.6.

Cheng Shu, "Modern diagnostic technique of engines", pp. 43-44, Dec. 12, 2006, 4 pages.

Hendrycks et al. "A baseline for detecting misclassified and out-of-distribution examples in neural networks." arXiv preprint arXiv:1610.02136 (2016), 14 pages.

Japanese Office Action and English Translation thereof in Japanese App. No. 2019-551365 dated Mar. 25, 2022 8 pages.

Japanese Office Action and English translation thereof in Japanese Application No. 2019-561829 dated May 13, 2022, 11 pages.

Japanese Office Action with translation in Japanese Application No. 2019-561829 dated Jan. 6, 2023, 5 pages.

Liu Bailin, "Artificial intelligence and expert system", Xi'an Jiao Tong University Press, pp. 210-215, Feb. 2012.

Office Action and Search Report with translation in Chinese Application No. 201880043894.9 dated Mar. 17, 2023, 17 pages.

Office Action with translation in Chinese Application No. 201880043894.9 dated Dec. 9, 2023, 44 pages.

Official Office Action in European Application No. 18799281.3 dated Dec. 15, 2022, 6 pages.

\* cited by examiner

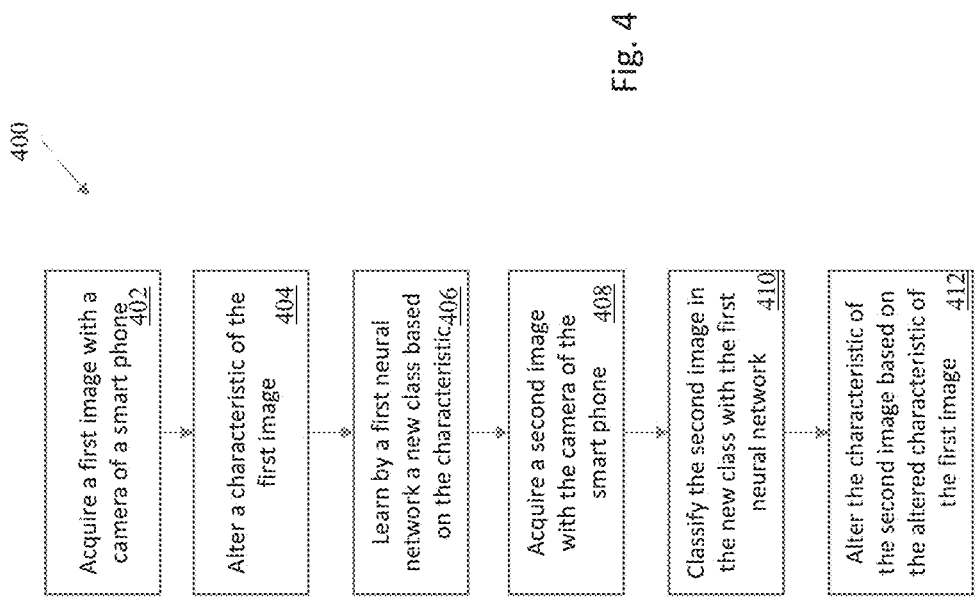

SYSTEMS AND METHODS FOR DEEP NEURAL NETWORKS ON DEVICE LEARNING (ONLINE AND OFFLINE) WITH AND WITHOUT SUPERVISION

CROSS-REFERENCE TO RELATED APPLICATIONS

This application is a bypass continuation of International Application No. PCT/US2019/033345, entitled "Systems and Methods for Deep Neural Networks on Device Learning (Online and Offline) with and without Supervision," filed on May 21, 2019, which in turn claims the priority benefit, under 35 U.S.C. § 119(e), of U.S. Application No. 62/680,937, entitled "Systems and Methods to Enable Continual, Memory-Bounded Learning in Artificial Intelligence and Deep Learning Continuously Operating Applications with and Without Supervision," filed on Jun. 5, 2018, and of U.S. Application No. 62/674,346, entitled "Systems and Methods for Deep Neural Networks on Device Learning (Online and Offline) with Applications to Photography, Image Processing, and User Behavior Understanding," filed on May 21, 2018. Each of these applications is incorporated herein by reference in its entirety.

BACKGROUND

Traditional artificial neural networks (ANNs) and deep neural networks (DNNs), which often include many layers of neurons interposed between the input and output layers, often require thousands or millions of iteration cycles to train. These cycles are frequently performed in a high-performance computing sever. In fact, some traditional DNNs may take days or even weeks to be trained, depending on the size of the input dataset.

One technique for training a DNN involves the backpropagation algorithm. The backpropagation algorithm computes changes of all the weights in the DNN in proportion to the error gradient from a labeled dataset via application of the chain rule in order to backpropagate error gradients. Backpropagation makes small changes to the weights for each datum and runs over all data in the set for many epochs.

The larger the step size taken per iteration cycle, the less likely that the gradient of the loss function can lead to actual performance gains. Thus, DNNs make small changes to their weights every training sample. Furthermore, since the gradient of the loss function computed for any single training sample can affect all the weights in the network (due to the typically distributed representations), standard DNNs are vulnerable to forgetting previous knowledge when they learn new objects.

Repetitive presentations of the same inputs over multiple epochs mitigates this issue of forgetting previous knowledge, with the drawback of making it extremely difficult to add new knowledge to the system quickly. This is one reason why learning is impractical or altogether impossible on a computationally limited edge device (e.g., a cell phone, tablet, or small form-factor processor). Even if the problem of forgetting was solved, learning on edge devices would still be impractical due to the high computational load of the training, small training steps, and repetitive presentation of all inputs.

These limitations are true for a single compute Edge across its deployment lifespan, where the Edge may update its knowledge, and for distributed, multi-Edge systems (e.g., smart phones connected in a network, networked smart cameras, fleets of drones or self-driving vehicles, and the like), where quick sharing of newly acquired knowledge is desirable for an intelligent agent across the agent's deployment life cycle.

In order to learn knowledge, a real-time operating machine that uses a traditional DNN may have to accumulate a large amount of data to retrain the DNN. The accumulated data is transferred from the "Edge" of the real-time operating machine (i.e., the device itself, for example, a self-driving car, drone, robot, etc.) to a central server (e.g., a cloud-based server) to get the labels from the operator and then retrain the DNN executed on the Edge. The more accumulated data there is, the more expensive the transfer process in terms of time and network bandwidth. In addition, interleaved training on the central server has to combine the new data with the original data that is stored for the whole life cycle of the system. This creates severe transmission bandwidth and data storage limitations.

Hence, due to the data-and-compute intensive nature of this training process, it is extremely cumbersome to add new knowledge on-the-fly exploiting relatively low-powered devices, such as personal computers, smart phones, tablets, Internet of Things (IoT) devices, and the like.

SUMMARY

The present technology extends Artificial Intelligence (AI), Artificial Neural Networks (ANNs), Deep Neural Network (DNNs), and other machine vision processes so that they can be trained at the compute Edge (e.g., on a smartphone, drone, or robot) through application of Lifelong Deep Neural Network (L-DNN) technology. The term "compute Edge," (also referred to herein as "Edge"), in particular as it relates to remote (cloud) compute, refers to computing systems that perform data processing at a device located at the edge of the computer network, near the source where data is generated. This approach involves leveraging resources that may not be continuously connected to a network, such as smartphones, tablets, personal computing devices, IoT devices, cameras, and other sensors.

Whereas AI (e.g., ANNs, DNNs) can be performed on remote or cloud resources, there are several benefits of operating the AI at the device level (Edge), some of which include:

Reduction of AI latency: because it is located at the Edge, the AI can achieve real-time or near real-time data analysis, since data is processed on a processor located directly at the local device level, not on a cloud or data center resource. Put differently, in conventional approaches, data is transmitted from the edge to a remote or cloud resource for processing. Once the data is processed (i.e., AI performed), instructions are transmitted from the remote or cloud resource back to the edge. By processing data at the device level, this transmission back-and-forth to and from the remote or cloud resource can be eliminated, thereby reducing latency;

Reduction of data transfer and network traffic: since data is processed at the device level, raw data does not need to be transmitted from the device via a computer network to a data center or cloud, thereby reducing network traffic;

Application of L-DNN technology allows one-shot learning, removing the need to store data for future use either on the edge or on the server.

Consequently, data transfer, data storage, and data manipulation costs related to remote AI applications are much lower for Edge computing than for cloud-based AI applications;

Data privacy: processing data (both inference and learning) at the device enhances user privacy and data security because user data is generated, processed, and discarded at the device level, possibly without being transmitted off the device and without being stored persistently on the device in raw form.

On-device learning techniques like L-DNN enable new sets of functionalities in devices that have limited compute power and/or connectivity to a central server, where these limitations on compute power and connectivity can be technical or related to data privacy. By learning directly on the device where the data is generated and/or used by the end user, the inventive technology unlocks capabilities previously only achieved with running AI (ANN, DNN) processes on a compute server.

Using unsupervised or semi-supervised L-DNN further simplifies the use of AI on the Edge by reducing the number and/or duration of AI-related user interactions with the device. This frees the user to pursue more creative tasks while retaining the ability of AI to learn both from data and from user actions that are performed normally during tasks that AI is designed to assist.

Edge devices capable of implementing the inventive methods include smart phones, tablets, and other devices (e.g., drones, robots, IoT devices, cameras, etc.). They can implement online and offline learning methods, including learning while the device is being used (online) and learning when the device is idle/offline (e.g., during battery recharge, overnight, or in other situations where the user is not actively interacting with the device). Learning can be executed locally in the device, namely, without broadcasting data to an external computing medium for learning, with all processing related to learning executed by an on-board processor. As an example, learning may occur on a smart phone or tablet or PC compute power, which may include a Central Processing Unit (CPU), a Graphic Processing Unit (GPU), a Neural Processing Unit (NPU), another co-processor available on-device (e.g., a vector co-processor or specialized ASIC or FPGA), or a combination of one or more of the above-mentioned processors.

On-device learning can be used to enhance engagement with the user device by intelligently augmenting, via learning directly on the user device, the knowledge of an ANN or DNN already implemented on the user device. Normally, the process of learning or enhancing the knowledge of an ANN or DNN is cumbersome and involves costly (in terms of time and compute power) training that normally occurs on a compute server or powerful workstation. Conversely, on-device learning, taking advantage of on-board processing power, can augment user experience in AI-powered applications. One example of this on-device learning is termed Lifelong Deep Neural Network (L-DNN) and disclosed in U.S. application Ser. No. 15/975,280, which was filed on May 9, 2018, and is incorporated herein by reference in its entirety. Other equivalent on-learning techniques may be used as well.

The method discussed herein can occur in two modes on the target device: (1) a fast, online learning mode; and (2) a slow, offline learning mode. In the fast learning mode/online mode, a real-time operating machine implementing L-DNN learns new knowledge and new experiences quickly so that it can respond to the new knowledge almost immediately. In this mode, the learning rate in the fast learning subsystem is high to favor new knowledge and the corresponding new experiences, while the learning rate of the fast subsystem in the slow learning mode/offline mode is set to a low value or zero to preserve old knowledge and the corresponding old experiences. In the slow learning mode/offline mode, the fast subsystem serves as a teacher to the slow subsystem. Therefore, the learning rate of the fast subsystem in slow learning mode/offline mode is set to a low value (e.g., zero) in order to reduce modification (e.g., low learning that is closer/similar to biology) of the fast subsystem.

Online: learning and adaptation of a fast learning module/fast learning subsystem in the L-DNN occurs while the user is actively using the device. In this case, learning occurs instantaneously either by using user-delivered supervision (e.g., an action performed by the user on the device) or using other events captured by the device. These other events may include endogenous events in the device (e.g., events triggered in the device OS, or by applications running on the device) or events captured in the network traffic of the device (e.g., incoming signals through wireless connectivity).

Offline: while learning still occurs entirely on-device, the update of the underlying AI algorithm occurs offline (e.g., when the device is idle), namely while the user is not actively engaged in using the device, or the AI is not actively engaged in performing a task. In the offline learning case, the L-DNN uses self-supervised learning to improve generalization and reduce the memory footprint. In this mode, the learning rate in the fast learning subsystem of L-DNN is low or zero and it serves as a supervisor to the slow learning system, while the learning rate in the slow learning subsystem is elevated to allow consolidation of learned features through an appropriate loss function (for example a triplet loss) driving a traditional back propagation of error.

Applications of this technology include, but are not limited to, enhancing AI, ANNs, and DNNs implemented in devices such as smart phones, IoT devices, drones, cameras, tablets, and use cases ranging from, but not limited to, photography, personal assistants, and other applications where AI is performing a task at the compute Edge.

Learning at the compute Edge enables AI embedded on a device at the compute Edge to adapt its output to the data immediately available at the device itself. Examples uses of this technology include: AI-powered photography; AI-powered personal assistants; and AI-powered data processing that occurs at the compute Edge in smart phones, IoT devices, cameras, and the like.

In summary, different variations of the inventive technology include:

On-device learning where training occurs on a continuous basis directly at the compute Edge, where the performance of the AI changes, and user experience of the device is continuously improved, by continuous learning;

This on-device learning in some implementations can be performed in unsupervised fashion to reduce the load on the user of the device and free the user for more creative tasks other than supervision of AI.

Offline learning on the device, where the system uses self-supervision to further improve the quality of AI and reduce its memory footprint.

A method of image processing with a smart phone executing a neural network comprising a fast learning subsystem and a slow learning subsystem is disclosed herein. The method includes acquiring a first image with a camera of the smart phone. The method also includes altering at least one characteristic of the first image in response to input from a user. The method also includes learning a new class by the fast learning subsystem based on the at least one characteristic of the first image altered in response to the input from the user. The method also includes acquiring a second image with the camera of the smart phone, classifying the second image in the new class with the fast learning subsystem, and in response to classifying the second image in the new class, automatically altering at least one characteristic of the second image on the smart phone based on the at least one characteristic of the first image altered in response to the input from the user.

In some implementations, the neural network can be a Lifelong Deep Neural Network. In some implementations, the method also includes providing the first image and the second image to the slow learning subsystem, generating ground truth data by the slow learning subsystem based on the first image and the second image, and providing the ground truth data to the fast learning subsystem.

In some implementations, the slow learning subsystem can be a Deep Neural Network. In some implementations, the method includes providing the first image and the second image to the slow learning subsystem when the smart phone is idle. In some implementations, the method also includes generating at least one feature vector using the slow learning subsystem for the first image and the second image, determining an error via the fast learning subsystem for the at least one feature vector based on a triplet loss function, and adjusting at least one weight of the slow learning subsystem based on the error.

In some implementations, determining the error includes computing a first distance between the at least one feature vector and a correct class label, computing a second distance between the at least one feature vector and an incorrect class label, and determining the error based on the first distance and/or the second distance.

In some implementations, the method also includes training the fast learning subsystem based on the ground truth data. In some implementations, training the fast learning subsystem occurs when the smart phone is charging and/or is idle.

In some implementations, the method also includes learning by the slow learning subsystem an identity of the first image and the second image. In some implementations, the identity of the first image and the second image includes at least one label for the first image and the second image. In some implementations, the method also includes teaching by the slow learning subsystem the identity of the first image and the second image to the fast learning subsystem.

A method of image processing with a smart phone is disclosed herein. The method includes acquiring a first image with a camera of the smart phone, and while the smart phone is in an idle state: creating a first label for the first image with a first subsystem included in a neural network executed by a processor on a smart phone, and teaching, by the first subsystem, the first label to a second subsystem included in the neural network executed by the processor of the smart phone.

In some implementations, the method also includes acquiring a second image with the camera of the smart phone, and applying the first label to the second image with the second subsystem.

In some implementations, the neural network is a Lifelong Deep Neural Network. In some implementations, the second subsystem can enable real-time learning. In some implementations, the teaching can include teaching the first label to the second subsystem via backpropagation.

In some implementations, the method includes acquiring a second image with a camera of the smart phone, determining by the second subsystem an association between a feature vector representing an object in the second image and a second label, and applying the second label to the object in the second image. In some implementations, the second label is received from a user. In some implementations, the second label is generated by the neural network.

A smart phone is disclosed herein. The smart phone includes an image sensor to acquire a first image and a second image. The smart phone also includes at least one processor executing a neural network. The neural network can include a first subsystem and a second subsystem. The at least one processor to: alter at least one characteristic of the first image in response to input from a user, learn via the first subsystem a new class based on the at least one characteristic of the first image, classify via the first subsystem the second image in the new class, and alter at least one characteristic of the second image based on the at least one characteristic of the first image.

In some implementations, the at least one processor can be further configured to generate via the second subsystem ground truth data based on the first image and the second image, and provide the ground truth data to the first subsystem.

In some implementations, the neural network can be a Lifelong Deep Neural Network. In some implementations, the second subsystem is a Deep Neural Network.

In some implementations, the at least one processor can be configured to generate the ground truth data when the smart phone is idle. In some implementations, the at least one processor can be further configured to: generate via the second subsystem at least one feature vector for the first image and the second image, determine via the first subsystem an error for the at least one feature vector based on a triplet loss function, and adjust at least one weight of the second subsystem based on the error.

In some implementations, the at least one processor can be further configured to: compute a first distance between the at least one feature vector and a correct class label, compute a second distance between the at least one feature vector and an incorrect class label, and determine the error based on the first distance and/or the second distance.

In some implementations, the at least one processor is configured to train the first subsystem based on the ground truth data. In some implementations, the at least one processor is further configured to train the first subsystem when the smart phone is charging and/or is idle.

In some implementations, the at least one processor can be configured to learn via the second subsystem an identity of the first image and the second image. In some implementations, the identity of the first image and the second image can include at least one label for the first image and the second image. In some implementations, the at least one processor can be further configured to teach via the second subsystem the identity of the first image and the second image to the first subsystem.

A method for manipulating a first image taken by a user is disclosed herein. The method includes analyzing using a Lifelong Deep Neural Network (L-DNN) implemented by a processor the first image. The L-DNN can include a first module and a second module. The method also includes extracting a feature set for the first image using the first module. The method also include determining using the second module similarity between the feature set and at least one previously extracted feature set. The at least one previously extracted feature set can be extracted from a plurality of previous images taken by a user. The method also includes in response to determining that the feature set and the at least one previously extracted feature set are similar, adding the first image to a cluster comprising the plurality of previous images.

In some implementations, the method also include in response to determining that the feature set and the at least one previously extracted feature sets are not similar: learning using the first module the feature set, and creating a first class for the first image.

The method also includes automatically applying at least one user setting associated with the plurality of previous images to the first image.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Other systems, processes, and features will become apparent to those skilled in the art upon examination of the following drawings and detailed description. It is intended that all such additional systems, processes, and features be included within this description, be within the scope of the present invention, and be protected by the accompanying claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 4 illustrates image processing in a smart phone using a Lifelong Deep Neural Network (L-DNN).

DETAILED DESCRIPTION

Figure 1:
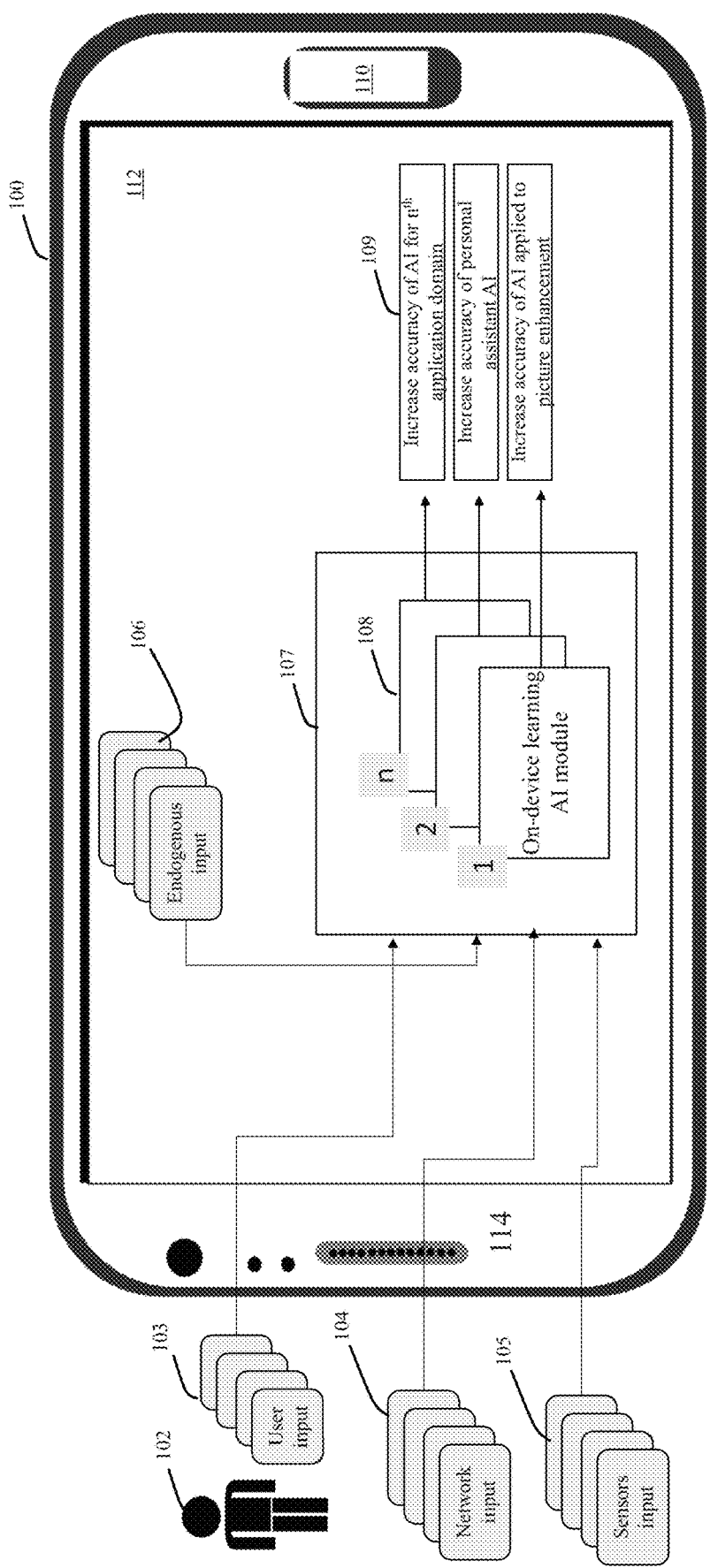
FIG. 1 illustrates an overview of various components of the system, using a smart phone as an example compute Edge device.

FIG. 1 provides an overview of a compute Edge device 100 (in this example, a smart phone 100). Other examples of edge devices include robots, drones, and IoT devices. The smart phone 100 has an on-board AI module 107 with one or, typically, several separate AI sub-modules 108 that process information. Each of these submodules 108 can be implemented as an L-DNN that serves a particular application, such as image classification. The on-board AI module 107 and the AI sub-modules 108 can be implemented in one or more suitable computer processors, such as graphics processor units (GPUs), field-programmable gate arrays (FPGAs), or application-specific integrated circuits (ASICs), with appropriate volatile and non-volatile memory and appropriate input/output interfaces.

The smart phone 100 includes or is coupled to one or more input sources. The smart phone's on-board input sources may include one or more digital cameras 110 (e.g., a front-facing camera and a rear-facing camera), a touch screen 112, a keypad, buttons, a microphone 114, an inertial measurement unit (IMU), an accelerometer, a gyroscope, and a network interface, such as an antenna or connection for a data cord. These input sources may acquire input 103 generated by a user 102, such as finger swipes, button pushes, spoken commands, and device movements, and/or information about the environment, including images, video data, structured light data, audio data, and location data (e.g., Global Positioning System data). The smart phone 100 may collect this information about the environment in the form of sensor input 105, possibly in response to user commands, e.g., taking a picture when the user pushes a button or recording audio or video data in response to a button push.

The smart phone 100 may also acquire input from network-generated events and data 104, user (102) generated input 103 and/or endogenous input 106 generated by the device. Endogenous input may be events generated by the phone operating system, including clock events, app usage, app events (e.g., 3 apps were opened between 2:00 PM and 2:45 PM), events intrinsic to a specific app (e.g., calendar), device power status, device movement, and the like. The exact nature of inputs used during learning is defined by the nature of the application that uses on-device learning. For instance, a personal assistant application might use calendar events, alarms, call logs, etc., while a photo manipulation application might use camera settings, user inputs, time of day inputs, etc. An on-device learning system, such as an L-DNN system, uses one or more of these data sources to learn and change the behavior of the AI module 107 and/or AI sub-modules 108, such as changing picture parameters based on the type of picture or other applications 109, etc.

Lifelong Deep Neural Network (L-DNN)

L-DNN implements a heterogeneous neural network architecture to combine a fast learning mode and a slow learning mode. In the fast learning mode, a real-time operating machine implementing an L-DNN, such as the smart phone 100 of FIG. 1, learns new knowledge and new experiences quickly so that it can respond to the new knowledge almost immediately. In this mode, the learning rate in the fast learning subsystem is high to favor new knowledge and the corresponding new experiences, while the learning rate in the slow learning subsystem is set to a low value or zero to preserve old knowledge and the corresponding old experiences.

Figure 2:
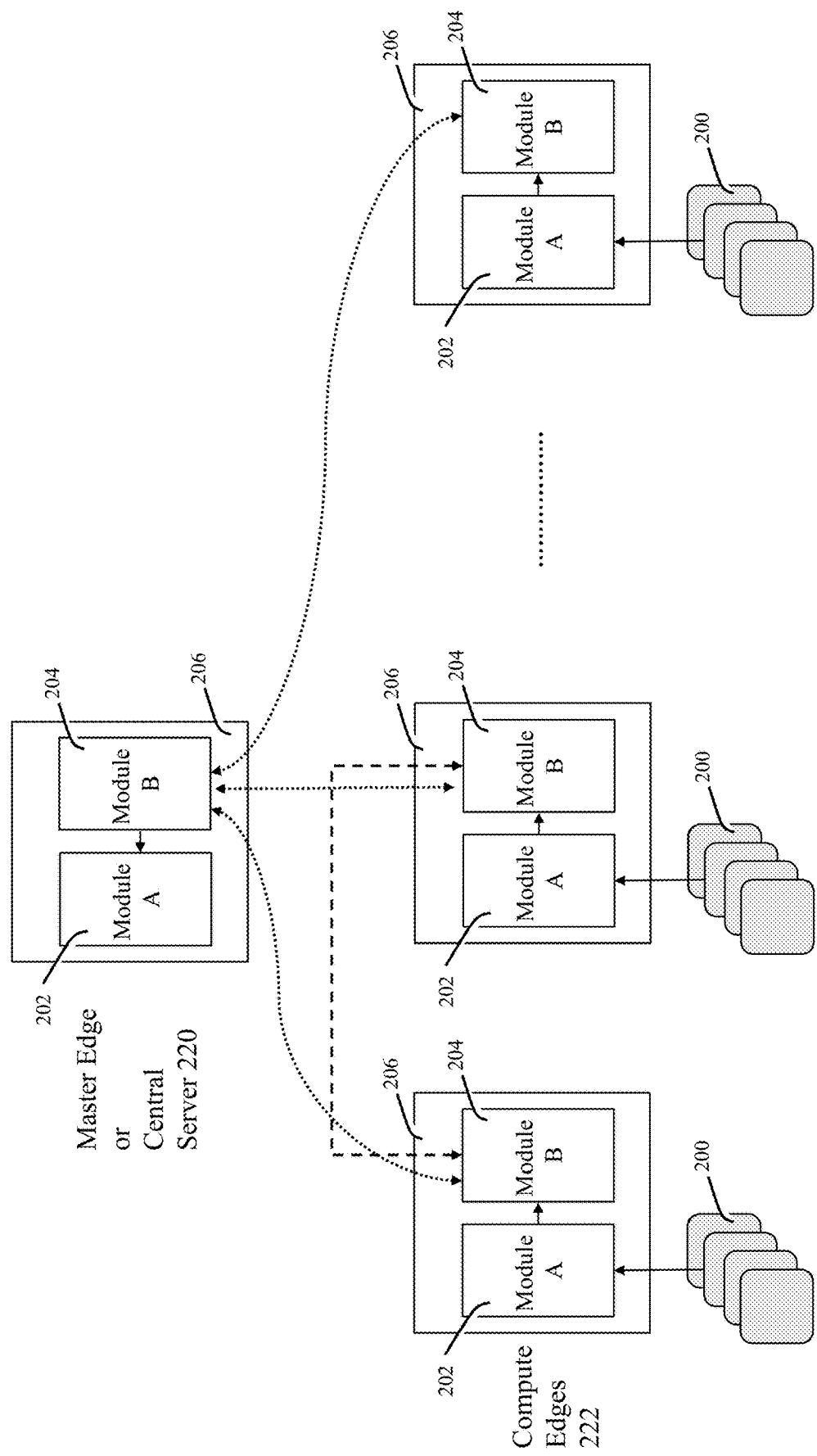
FIG. 2 illustrates an overview of a Lifelong Deep Neural Network (L-DNN) as it relates to multiple compute Edges, either acting individually over a data stream, or connected peer-to-peer or via an intermediary compute server.

FIG. 2 provides an overview of L-DNN architecture where multiple devices, including a master edge/central server 220 and several compute edges 222 (e.g., smartphones, drones, robots, or other IoT devices), running L-DNNs operate in concert. Each device 220, 222 receives sensory input 200 and feeds it to a corresponding L-DNN 206 comprising a slow learning Module A 202 and a fast learning Module B 204. Each Module A 202 is based on a pre-learned (fixed weight) DNN and serves as feature extractor. It receives the sensory input 200, extracts the relevant features into compressed representations of objects and feeds these representations to the corresponding Module B 204. Module B 204 is capable of fast learning of these object representations. During supervised mode, through the interactions with the user, Module B 204 receives correct labels for the unfamiliar objects, quickly learns the association between each feature vector and corresponding label, and as a result can recognize these new objects immediately. In unsupervised mode, the system uses feature similarities between vectors to assign these vectors into the same or different classes.

The L-DNN 206 takes advantage of the fact that weights in the DNN are excellent feature extractors. The Module B 204 continuously processes the features extracted by Module A 202 as the input source 200 provides data. The Module B neural network classifier 204 uses fast, one-shot learning to associate these features with object classes.

In the fast learning mode, when a novel set of features is presented as input 200, Module B 204 associates these features with a class label that is given by the user in supervised mode or generated internally in unsupervised mode. In either case, Module B 204 is now familiar with this input and can recognize it on the next presentation. The result of Module B 204 serves as an output of L-DNN 206 either by itself or as a combination with an output from a specific DNN layer from Module A 202, depending on the task that the L-DNN 206 is solving.

The slow learning mode uses a set of labeled training inputs from the user in the similar way to conventional DNN training, but this set can be much smaller and can contain for example only the inputs for which L-DNN has shown poor performance. The user provides the label for each input 200 to Module B 204. Module B 204 converts this label into a prototype feature vector that Module B 204 expects to see for this particular label. At the same time, Module A 202 does a forward pass on the input 200 and computes the resulting feature vector. A contrastive loss function computes the distance between the prototype and computed feature vectors and backpropagates the error through Module A 202 to make the computed feature vector closer to the prototype that Module B 204 expects for this input. A contrastive loss function either reduces or minimizes the distance between the prototype and the computed feature vectors if they match or increases or maximizes the distance between the prototype and the computed feature vectors if they don't match. This results in features of an object, e.g., a dog, extracted by Module A 202 to be more like a prototypical dog with features expected by Module B 204. In a complementary procedure, the user can provide an additional label with input 200 to serve as a negative example for a given class, e.g., an image of a cat, and then a triplet loss function generates an error to move the feature vector of a dog further away from a prototypical feature vector for a cat and closer to prototypical feature vector for a dog.

Triplet loss is used in conventional DNNs to improve the quality of the feature vectors by adjusting the weights of the DNN as following. For each presented input, the feature vector is computed through the usual forward pass through the DNN. The triplet loss function compares this feature vector with the prototypical feature vector for the classes known to DNN. For classes that are not correct for this input, the distance between their prototypes and the input feature vectors needs to increase as a result of backpropagation. For the correct classes, the distance between class prototype and the input feature vector shall decrease as a result of backpropagation.

As a result, an iterative process that cycles through stages of fast learning and slow learning as the L-DNN system operates in a dynamic environment becomes possible.

Fast learning of new objects happens as discussed above during real time operation (e.g., when the device is active) of the L-DNN system in the environment. Module B 204 weights are updated to contain this new knowledge, Module A 202 weights are unchanged. This stage continues for as long as new input information continues to flow into the system.

When the situation allows to disconnect the system from environmental input (e.g., when the device is idle or offline) for a substantial period of time, and if the examples of some, preferably confusing objects are still available, slow learning within Module A 202 can happen. Examples of objects are presented to the system together with the ground truth as in conventional DNN training. A forward pass through Module A 202 of the L-DNN 206 creates a feature vector for each input. This feature vector activates Module B 204, which provides positive (correct class label) and negative (incorrect class label) examples in triplet loss computation. A triplet loss function computes the error, which is backpropagated and adjusts the weights in Module A 202. In this stage only the weights of Module A 202 change. Module B 204 weights stay constant to fix the prototypes in place and reduce forgetting of previously learned information.

The result of this iterative loop is a continuously learning L-DNN 206 that operates very close to how the brain operates according to the sleep consolidation hypothesis. The L-DNN 206 also inherits the flexibility of the brain in the sense that if certain exemplars of objects disappear from the world and are no longer parts of the input, the L-DNN 206 gradually adjusts the prototypes towards the remaining exemplars that are still relevant for performance.

Additional advantages can be gained by L2 normalization of the feature vectors during training of a DNN used in Module A of L-DNN. L2 normalization reduces feature comparison to simple geometric operations further improving ease of clustering of similar objects.

Working in unsupervised mode, L-DNN allows an additional set of use cases where the user's involvement during learning process is either undesirable or impossible. An example of such a use case is described below.

Example Use Cases of Unsupervised L-DNN

The following use cases are non-limiting examples of how an L-DNN operating in an unsupervised regime can address technical problems in several image search, edit, and manipulation applications.

Using Unsupervised L-DNN for Image Manipulation Based on Clustering

Consider a photo management or editing applications developer wanting to automate the priority settings for editing or management actions based on one or more similarities between the image currently in processing and other images previously processed for a particular user. For example, if the user consistently applies certain filters to all the beach scenes, or consistently places them in a certain album, then the unsupervised L-DNN system can determine the similarity of a new scene to the beach scenes and suggest these filters and album as first choices in the user action menus.

The following use case illustrates a possible application of the technology described herein. The use of a L-DNN on a camera-enabled mobile device, such as a smart phone, allows for fine-grained optimization of photos taken and edited on the device. Users can apply smart filters and customize the look and feel of the images they take before sharing, printing, or otherwise using the photos.

Traditionally, a DNN used on a mobile device is trained before being installed and is only capable of applying the learning on which it was trained. There is no capability for the DNN to learn based on the device user's behavior. In other words, the DNN is limited to its factory functionality.

Heavy mobile photo users may take and want to adjust the settings on hundreds of images in a very short timeframe. The need to adjust each picture manually severely limits the number of images that a user can customize and increases the amount of effort required to maintain a constant throughput of personally-optimized photos.

Figure 3:
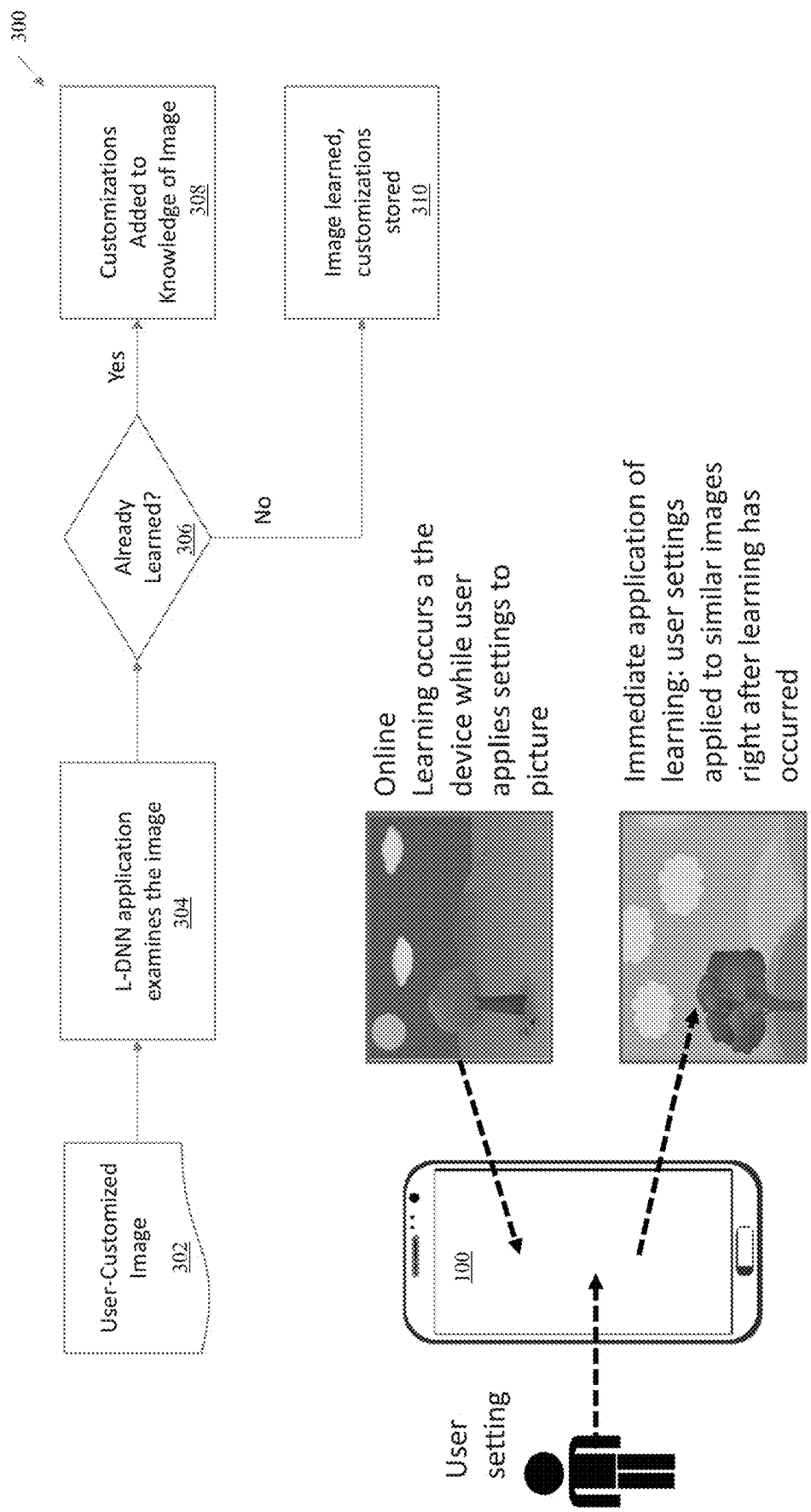
FIG. 3 illustrates an example workflow of the method for picture enhancement in a smart phone.

The application of an L-DNN to the photo editing workflow allows each mobile device to learn the preferences of its user as that person customizes their photos. This application is run on the device, keeping user data local and ensuring data privacy and security. FIG. 3 illustrates a process 300 of learning at the edge for photography with an Edge device like the smart phone 100 in FIG. 1 or another device with a digital camera. In this process 300, a picture is automatically examined by an on-device learning system—in this case, using L-DNN. At 304, the Edge device examines a user-customized image 302 using the L-DNN and determines if the user-customized image 302 matches any previously learned image (e.g., at 306), namely, if the image is classified as belonging to a previously encountered image class.

The user-customized image 302 is fed as input (e.g., input 200 in FIG. 2) to an L-DNN (e.g., L-DNN 206 in FIG. 2) executed on the smart phone 100. A slow learning module of the L-DNN (e.g., Module A 202 in FIG. 2) extracts the features of the picture and a fast learning module of the L-DNN (e.g., Module B 204 in FIG. 2) analyzes the similarity between the extracted feature set and the feature sets extracted from the previous pictures this user took and processed. If the new features are sufficiently close (defined by the neural network parameters of the fast learning module (e.g., Module B 204 in FIG. 2) and can be exposed in the user settings) to one of the previously learned prototypes, then the new picture is added to the cluster of similar pictures 308 and the Edge device stores customizations of this image in local memory in association with that learned image class. If the user-customized image 302 does not match any previously learned images, then at 310, the L-DNN on the Edge device (smart phone 100) learns the image 302 and creates an additional class. The new class is then immediately usable by the Edge device user as a new class, and the Edge device stores custom user settings in local memory in association with that class. Then the history of user actions for this cluster is used to order the actions in the menu of available actions. This results in a menu personally tailored not only to the specific user, but also to a specific class of images. In this case, no user input is required, and the on-device learning system using the L-DNN uses its own output as a teaching signal to modify the classification outcome.

This process 300 in FIG. 3 enables the L-DNN on the mobile device to learn the types of photos taken by the user and the settings associated with each of those photo types. The L-DNN may apply those settings to additional photos based on the photos' shared characteristics. This reduces or eliminates the need for the user to apply the same custom settings to multiple similar images and increases the efficiency with which the user can optimize multiple images.

Image Processing on a Smart Phone with L-DNN

FIG. 4 illustrates image processing 400 in a smart phone (e.g., the smart phone 100 in FIG. 1) that can learn at the edge in a supervised or unsupervised fashion. At 402, the smart phone 100 acquires a first image with a camera 110 (e.g., the smart phone's camera or another digital camera communicatively coupled to the smart phone). At 404, one or more characteristics of the first image can be altered based on user input. For instance, the user can customize the first image to change characteristics such as brightness, contrast, and/or the like. At 406, a first neural network (e.g., an L-DNN) can learn the characteristics and can create a new class based on the characteristics. At 408, the smart phone 100 acquires a second image with the camera 110. The L-DNN then examines the second image and determines if the second image matches any previously-learned images. If the L-DNN determines that the second image matches the first image, at 410, the L-DNN classifies the second image in the new class as the first image. At 412, the smart phone applies the user-customization (e.g., change(s) in the image characteristic(s)) that was applied to the first image to the second image.

This process is described with an example below:

A user is at the beach and takes five photographs (#1, 2, 3, 4, 5). The photos are not exactly the same but feature similar elements, such as sand, water, sky, and people.

The user opens photo #1 and uses the phone's photo application to change the photo settings. Contrast is increased, brightness is decreased, and the blue of the water and sky are made more vibrant.

Photo #1 and its user-applied settings are submitted to the L-DNN.

The L-DNN learns the characteristics of photo #1, creates a new "class" of knowledge and assigns it a photo class ID (e.g., ABC123). The user's custom settings are stored in association with that photo class ID.

The user opens photo #2. Before the user makes any edits, photo #2 is submitted to the L-DNN.

The L-DNN examines photo #2 and determines that photo #2 is a member of photo class ABC123 because photo #2 has similar characteristics to photo #1.

The user's stored settings are applied to photo #2. Photo #2 is adjusted with the same settings as the user applied to the photo #1, but without the user having to re-create those settings.

While L-DNN as described above works in this application in unsupervised mode, it still retains all the capabilities of a full L-DNN. For example, all the local knowledge from a particular device 100 for the user can be shared and updated through brain melding with all the other devices this user can utilize to take, manipulate and/or edit images. Furthermore, the effects of user actions can be used as partial supervision for L-DNN without the need to force the user to explicitly label the clusters. For example, if the user consistently applies the same actions to several clusters, L-DNN can unify them in a single cluster and treat them as a single entity from this point on. On the other hand, if the user follows more than one common scenario for different members of the same cluster, the system can automatically adjust internal parameters and split this cluster into multiple smaller clusters.

Another feature for such applications that unsupervised L-DNN enables is batch image manipulation based on similarity. In this case the user provides an example image to the L-DNN, which selects all similar images from either local storage, cloud or all the devices of this user and allows image manipulation on all of these images as a batch. This feature does not require the L-DNN to return only the images it has seen before; any previously unseen image undergo similarity evaluation by L-DNN and are either added to the batch or skipped. Settings changes or filters are applied to all images in a batch. Similarly, all images in a batch can be moved to the same album, shared, or deleted. This may save time and effort in use cases in which a user wishes to edit or manipulate multiple photos.

Using Unsupervised L-DNN for Image Search

The last feature discussed in the previous use case can be taken to the industrial level of a large-scale image search based on similarities between images instead of verbal tags. In this use case the user provides a sample image to the L-DNN system. L-DNN either selects an existing cluster prototype or creates a new prototype if none of the existing prototypes is close enough. Then the L-DNN goes through all available images that can be in the large database on a server or even scattered across a multitude of servers on the internet. Images that are in the same cluster are selected and ranked based on the similarity to the prototype, and then returned to the user as a result of the search. In some implementations, this feature can be performed on an edge device such as smart phones, tablets, and other edge devices (e.g., drones, robots, IoT devices, cameras, etc.). In some implementations, this feature can be performed on distributed, multi-Edge systems (e.g., smart phones connected in a network, networked smart cameras, fleets of drones or self-driving vehicles, and the like).

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A smart phone, comprising:
a local memory;
an image sensor to acquire a first image and a second image; and
at least one processor operably coupled to the local memory and the image sensor and executing a neural network, the neural network including a classifier configured to learn at a first rate while a user is using the smart phone and a feature extractor configured to learn at a second rate slower than the first rate while the user is not using the smart phone so as to preserve knowledge of features learned previously by the feature extractor, wherein the at least one processor is configured to:
extract, with the feature extractor, a first feature vector from the first image;
in an unsupervised mode while the user is using the smart phone and without transmitting data from the smart phone to an external computing medium, create a new cluster for the first feature vector;
perform an alteration of the first image in response to input from the user;
store the alteration in the local memory in association with the new cluster;
extract, with the feature extractor, a second feature vector from the second image;
in the unsupervised mode and without transmitting data from the smart phone to the external computing medium, assign, with the classifier, the second feature vector to the new cluster based on similarities between the first feature vector and the second feature vector; and
in response to assigning the second feature vector extracted from the second image to the new cluster, suggest, to the user, applying the alteration to the second image.

2. The smart phone of claim 1, wherein the at least one processor is further configured to:
generate, via the classifier, ground truth data based on the first image and the second image; and
provide the ground truth data to the feature extractor.

3. The smart phone of claim 2, wherein the neural network is a Lifelong Deep Neural Network.

4. The smart phone of claim 2, wherein the feature extractor is a Deep Neural Network.

5. The smart phone of claim 2, wherein the at least one processor is configured to generate the ground truth data when the smart phone is idle.

6. The smart phone of claim 5, wherein the at least one processor is further configured to:
determine, via the classifier, an error for at least one of the first feature vector or the second feature vector based on a loss function; and
adjust at least one weight of the second subsystem feature extractor based on the error.

7. The smart phone of claim 2, wherein the at least one processor is configured to train the classifier based on the ground truth data.

8. The smart phone of claim 7, wherein the at least one processor is further configured to train the classifier when the smart phone is charging and/or is idle.

9. The smart phone of claim 2, wherein the at least one processor is configured to learn, via the feature extractor, an identity of the first image and the second image.

10. The smart phone of claim 9, wherein the identity of the first image and the second image includes at least one label for the first image and the second image.

11. The smart phone of claim 9, wherein the at least one processor is further configured to teach, via the feature extractor, the identity of the first image and the second image to the classifier.

12. The smart phone of claim 1, wherein the classifier is configured to learn at a third rate while the neural network is idle and the feature extractor is configured to learn at a fourth rate faster than the third rate while the neural network is idle.

13. The smart phone of claim 1, wherein the at least one processor is configured to perform the alteration of the first image by applying a filter to the first image.

14. The smart phone of claim 1, wherein the classifier is configured to create the new cluster without altering weights of the feature extractor.

15. The smart phone of claim 14, wherein learning by the feature extractor comprises adjusting the weights of the feature extractor.

16. The smart phone of claim 1, wherein the classifier is configured to create the new cluster by associating the first feature vector with a class label based on the first image.

17. A method for manipulating a first image and a second image taken by a user using a Lifelong Deep Neural Network (L-DNN) implemented by a processor of an edge device, the L-DNN comprising a feature extractor and a classifier, the method comprising:
    extracting, using the feature extractor, a feature set for the first image;
    learning, by the classifier in an unsupervised learning mode, a new class based on the feature set without altering weights of the feature extractor and without transmitting data from the edge device to an external computing medium;
    performing an alteration of the first image in response to input from a user of the edge device;
    storing, in a local memory of the edge device, at least one user setting for the alteration in association with the new class;
    extracting, using the feature extractor, a feature set for the second image;
    clustering, by the classifier, the feature set for the second image with the feature set for the first image in a cluster for the new class based on similarities between the feature set for the second image and the feature set for the first image; and
    in response to clustering the feature set for the second image in the cluster for the new class, suggesting, to the user, applying the at least one user setting to the second image.

18. The method of claim 17, wherein learning the new class occurs without supervision by or input from the user.

19. The method of claim 17, wherein learning the new class is based at least in part on input from the user.

20. The method of claim 17, wherein learning the new class without altering the weights of the feature extractor prevents the feature extractor from forgetting previously learned knowledge.

21. The method of claim 17, wherein applying the at least one user setting to the first image comprises applying a filter to the first image and suggesting applying the at least one user setting to the second image comprises suggesting applying the filter to the second image.

22. The method of claim 17, wherein the classifier is configured to learn at a first rate while a user is using the edge device and the feature extractor is configured to learn at a second rate slower than the first rate while the user is not using the edge device.

23. The method of claim 17, further comprising:
    learning, by the feature extractor, a new object, wherein learning, by the feature extractor, comprises adjusting the weights of the feature extractor.

* * * * *